Dec. 31, 1957  A. E. LAEMMEL  2,818,546
OSCILLOGRAPHIC IMPEDANCE INDICATORS
Filed Jan. 11, 1952  2 Sheets-Sheet 1

INVENTOR
ARTHUR E. LAEMMEL
BY Ralph B. Stewart
ATTORNEY

Dec. 31, 1957      A. E. LAEMMEL      2,818,546
OSCILLOGRAPHIC IMPEDANCE INDICATORS
Filed Jan. 11, 1952      2 Sheets-Sheet 2
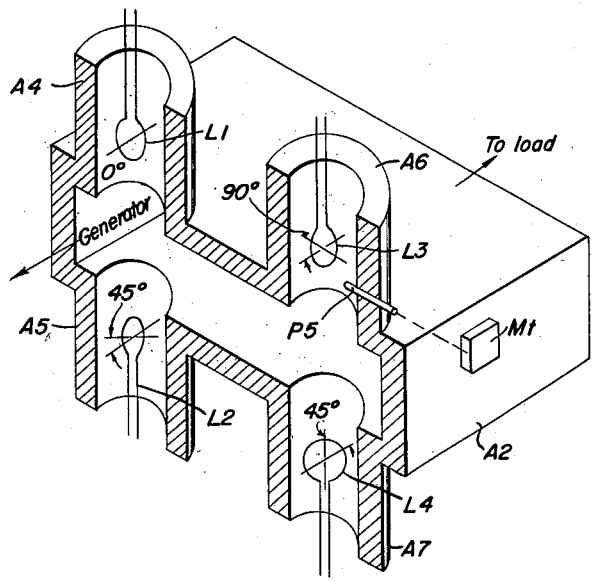
*Fig. 5.*
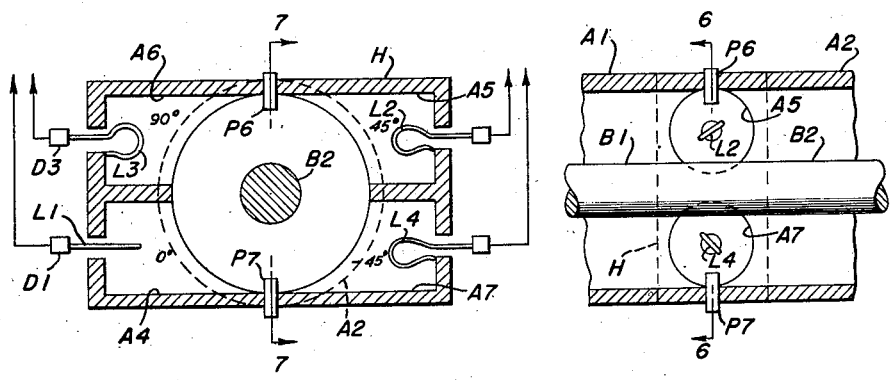
*Fig. 6.*      *Fig. 7.*
INVENTOR
ARTHUR E. LAEMMEL
BY *Ralph B. Stewart*
ATTORNEY United States Patent Office 2,818,546
Patented Dec. 31, 1957

2,818,546

OSCILLOGRAPHIC IMPEDANCE INDICATORS

Arthur E. Laemmel, Brooklyn, N. Y., assignor to Polytechnic Institute of Brooklyn, Brooklyn, N. Y., a corporation of New York Application January 11, 1952, Serial No. 265,943

9 Claims. (Cl. 324—58)

This invention relates to devices for producing an oscillographic indication of high-frequency impedances over a frequency range of the order of 100 megacycles to 10,000 megacycles per second.

This invention is based upon and utilizes the novel transmission line junctions disclosed in my application Serial No. 265,944, filed January 11, 1952, and entitled "Impedance Measuring Devices." As explained in my copending application, the novel transmission line junctions involve at least three arms, that is, an input arm connected to a wave source, a load arm connected to an unknown impedance to be measured, and a measuring arm or side-arm formed of a circular waveguide section connected at one end to the junction and having an elliptically polarized standing wave pattern established therein, the pattern corresponding to the standing wave pattern established over a wave length section of the main transmission line. Thus, by inserting a pick-up loop into the outer end section of the side-arm and turning this loop about the axis of the side-arm, the voltage induced in the loop through a complete revolution will vary in magnitude corresponding to the probe voltage variation of a slotted line section where the probe is moved throughout a full wave length in the slotted line section. The elliptically polarized standing wave pattern established in the circular side-arm remains the same for different operating frequencies, and this feature forms the basis for a number of advantages of the circular side-arm junction over the conventional slotted line section, as more fully explained in my copending application.

The principal object of the present invention is to devise an instrument for utilizing my improved circular side-arm transmission line junction for producing an oscillographic indication of the impedance components and other impedance factors.

A more specific object is to devise an instrument for the automatic indication of certain characteristics of an unknown impedance upon a Smith chart applied to the screen area of a cathode-ray tube.

In attaining the objects of my invention, one or more circular side-arms are provided in the transmission line junction, and in each side-arm there is established a stationary elliptical polarized wave corresponding to the standing wave established within the load arm of the junction. Four pick-up elements are mounted in one or more of the elliptically polarized fields at different angular spacings about the axis of the field. Specifically, the probes are spaced 45 degrees apart. The pickup voltages are then detected by square-law detectors, and the outputs of these detectors are combined in pairs and supplied to the horizontal and vertical deflection plates of a cathode-ray tube which may have a Smith chart arranged over its screen area.

Various forms of my invention are illustrated in the accompanying drawing, in which Figure 1 shows the invention applied to a coaxial transmission line junction provided with a single circular side-arm containing four probe elements mounted at equal angular spacings.

Figure 2 shows a modification of the arrangement of Figure 1 in which the junction is provided with two oppositely extending circular side-arms, each containing two directional pick-up elements in the form of crossed pick-up loops. Figures 3 and 4 are sectional views of Figure 2 taken along the lines 3—3 and 4—4 respectively.

Figure 5 is a transverse sectional view of a rectangular waveguide junction showing a further modification in which each pick-up element is mounted within an individual circular side-arm.

Figure 6 is a transverse sectional view through a coaxial cable junction provided with four circular side-arms, each containing a directional pick-up element, and Figure 7 is a sectional view of Figure 6 taken along the line 7—7.

Figure 1:
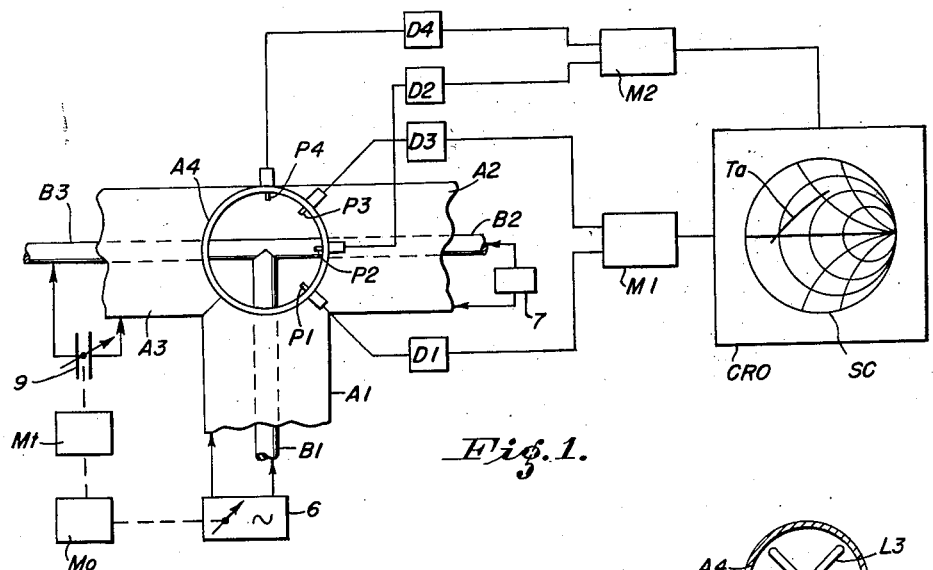

Referring to Figure 1 of the drawing, the transmission line junction involves three coaxial cable arms A1, A2, and A3 arranged in a T-junction, and a circular waveguide arm A4 coupled to the T-junction at right-angles to the plane of the T. The center conductors for the three coaxial cable arms are shown at B1, B2, and B3, respectively. Arm A1 is the input arm and is connected to a suitable high-frequency wave generator 6, which may be of fixed frequency or of variable frequency. The load arm A2 is terminated by an unknown impedance 7. The third arm A3, which is aligned with the load arm, is terminated by a variable condenser 9, which may be of the form disclosed in my copending application.

Four pick-up elements, such as probes P1, P2, P3, and P4, are inserted through the side wall of the circular side-arm A4 at equal angular spacings of 45 degrees, the probe P1 being located on the reference axis which bisects the angle between the input arm A1 and the load arm A2. The pickup elements are connected to individual square-law detectors represented at D1 to D4 respectively. The outputs of detectors D1 and D3 are combined in opposing relation in a mixing amplifier M1, and the output of this amplifier is supplied to the horizontal deflection plates of a cathode-ray oscilloscope CRO. The outputs of detectors D2 and D4 are combined in opposing relation in a mixer amplifier M2 and the output of this amplifier is supplied to the vertical deflection plates of the oscilloscope CRO. A Smith chart SC of the type described in Electronics for January 1939 may be applied over the screen area of the scope CRO.

With condenser 9 adjusted to produce unity reactance at the frequency of generator 6, the transmission line junction shown in Figure 1 establishes within the circular side-arm A4 a magnetic field which is elliptically polarized about the axis of the arm and is formed of two $H_{11}$ mode components at right-angles to each other. As more fully explained in my copending application, all modes except the $H_{11}$ modes must be eliminated within the side arm before the wave energy reaches the pick-up elements, and this may be done by dimensioning the side-arm below cut-off for all modes except the $H_{11}$ and locating the pick-ups sufficiently far from the mouth of the side-arm so that the higher modes are dissipated before they reach the pick-up elements. Also, suitable wave filters may be inserted between the junction and the pick-up elements to eliminate the unwanted modes, see my co-pending application Serial No. 265,944.

It can be demonstrated mathematically that the difference between the outputs of detectors D1 and D3 varies according to the cosine of the angle of the reflection coefficient and the difference between the outputs of the detectors D2 and D4 varies according to the sine of this angle. In addition, both differences are proportional to the amplitude of the reflection factor. Accordingly, the outputs of mixing amplifiers M1 and M2 represent the rectangular co-ordinates of the reflection coefficient of the unknown impedance, and by applying the output of M1 to control the horizontal deflection plates of the scope CRO and the output of M2 to control the vertical deflection plates, the beam of the scope is deflected from the center of the screen area and in a direction and to a radius to indicate the angle and amplitude respectively of the reflection coefficient. By applying the Smith chart SC to the screen area, it is possible also to indicate other characteristic factors of the unknown impedance, such as the resistance and reactance components.

By varying the frequency of generator 6 periodically over a given frequency range, and by simultaneously varying condenser 9 to maintain unity reactance at all times, the beam of the cathode-ray tube will be deflected periodically over a trace-line Ta which defines the impedance locus over the frequency range supplied to the junction. The frequency of generator 6 may be varied periodically by any suitable means represented by the motor Mo, and this motor is arranged to drive the variable condenser 9 simultaneously through a suitable motion translating device represented at Mt. This device may take the form of a cam of suitable outline for driving the movable element of the condenser 9 to produce the necessary capacitance variation in order to maintain unity reactance throughout the frequency range.

Figure 2:
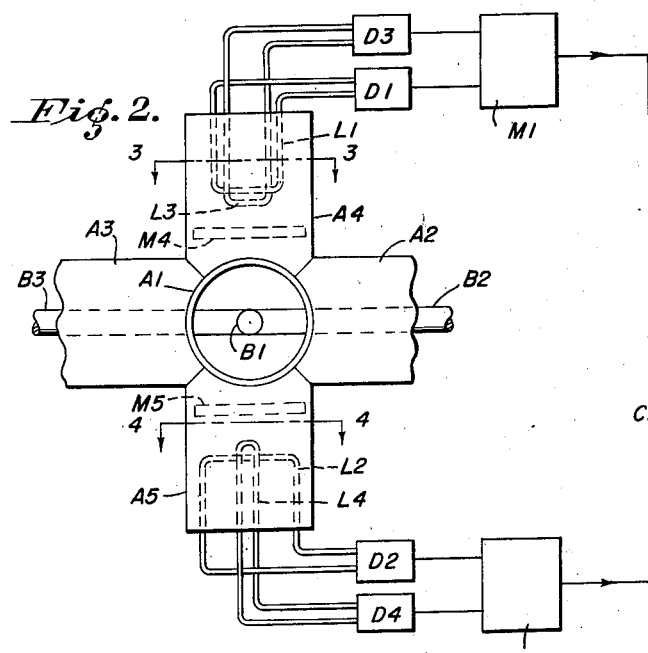
Figure 3:
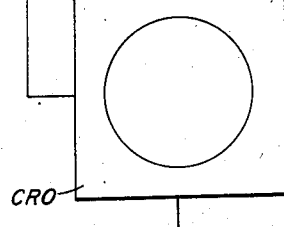
Figure 4:
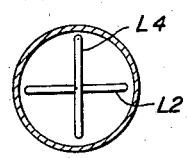

Figure 2 shows a modification of Figure 1 in which the transmission line junction has been rotated about the common axis of arms A2 and A3 so that the input arm A1 is normal to the plane of the paper. Various elements in Figure 2 corresponding to like elements in Figure 1 are represented by the same reference numerals. Instead of locating all four pick-up elements in one circular side-arm, a second circular side-arm A5 is arranged in axial alignment with the arm A4 on the opposite side of the junction, and each circular side-arm is provided with two pick-up elements in the form of crossed pick-up loops. For example, side-arm A4 contains loops L1 and L3 arranged at right-angles to each other, and side-arm A5 contains pick-up loops L2 and L4 also arranged at right-angles to each other. One set of loops is displaced with respect to the other set by 45 degrees, as will be seen from Figures 3 and 4, so that the four loops are progressively displaced from each other by intervals of 45 degrees. The showing of the loops in Figure 2 does not accurately represent the angular positions of the loops, but such angular positions are correctly indicated in Figures 3 and 4. As described in connection with Figure 1, mode filtering means, shown at M4 and M5, are provided in the two circular side arms to eliminate all modes except the $H_{11}$ mode.

The mode of operation of Figure 2 is believed to be clear from the explanation of Figure 1, since the operation is the same as in the case of Figure 1 except that pick-up voltages are obtained from two side-arms instead of from a single side-arm. Certain elements shown in Figure 1 have been omitted from Figure 2 as being unnecessary to explain the modified form of the invention. Pick-up probes of the type shown in Figure 1 may be employed in Figure 2 instead of the pick-up loops if desired.

In Figure 5 I have shown a modification of the invention applied to a rectangular waveguide junction in which each pick-up element is mounted within an individual side-arm. As more fully explained in my copending application, the waveguide junction is formed of a section of rectangular waveguide connected between the wave generator and the load, and the two end portions of the section constitute the input and the load arms respectively. Only the load arm A2 is shown in Figure 5. Four circular side-arms A4, A5, A6, and A7 are coupled to the broad faces of the rectangular waveguide through openings located in a common transverse plane and equally displaced from the longitudinal center of the waveguide. By this arrangement, identical elliptically polarized fields will be established in all four side-arms. In the case of Figure 1, four pick-up elements in the form of angularly spaced probes could be mounted in any one of the four circular side-arms, but Figure 5 shows each arm provided with its individual pick-up element or loop. The various loops are oriented with the same angular displacement as in Figure 2, that is, the plane of loop L1 is located in the reference plane with its axis at zero degrees displacement with respect to the axis of the main guide. Loop L2 has its axis displaced 45 degrees with respect to the waveguide axis, the axis of loop L3 is displaced 90 degrees with respect to the waveguide axis, and the axis of loop L4 is displaced 45 degrees on the opposite side of the waveguide axis from the axis of loop L2. As in the case of Figure 2, the various loops are connected to individual detectors D1 to D4 respectively, and these detectors are connected in pairs through mixing amplifiers to a cathode-ray oscilloscope in the same manner as described for Figures 1 and 2.

The operation of Figure 5 will be apparent from the foregoing description of the operation of Figures 1 and 2. Where the frequency of the applied energy is varied throughout a given range, as explained in connection with Figure 1, the frequency sensitivity of each side-arm may be compensated by providing an axially shiftable probe P5 extending inwardly through the wall of the side-arm near the mouth of the arm, and this compensating probe may be moved in and out periodically in synchronism with the frequency varying cycle. This may be accomplished by suitable cam mechanism represented by Mt which would be driven by the motor which varies the frequency of the generator, see Figure 1.

Figures 6 and 7 show an arrangement similar to Figure 5 except that the transmission line which connects the generator with the load is formed of a coaxial cable. The input and load arms A1 and A2 of the coaxial cable extend in opposite directions from a junction housing H which contains four circular bores forming the four side-arms A4, A5, A6, and A7. These bores contain pick-up loops L1 to L4 respectively which are connected to square-law detectors D1 to D4 respectively. Conducting probes P6 and P7 extend into the outer conductor of the main coaxial cable on opposite sides thereof and are located in the transverse reference plane of the housing H. These probes aid in establishing the elliptically polarized field in each side-arm, as more fully explained in my copending application. The four loops in Figure 6 are oriented at different angular positions with respect to the transverse reference plane in which all of the loops are located. For example, the axis of loop L1 lies in the reference plane; the axis of loop L3 is at 90 degrees to the reference plane; and the axes of loops L2 and L4 are at 45 degrees on opposite sides of the reference plane. As in the previous arrangement, the outputs of detectors D1 and D3 are combined in opposing relation in a mixing amplifier and supplied to the horizontal plates of a CRO indicator. The outputs of detectors D2 and D4 are combined in opposing relation in a mixing amplifier and supplied to the vertical plates of a CRO indicator. Where the frequency of applied energy is varied periodically over a given range, the frequency error may be corrected automatically by arranging a cam device to shift the probes 6 and 7 in and out in synchronism with the variation in frequency.

I claim:

1. An impedance indicating device comprising a cathode-ray oscilloscope having two pairs of deflecting elements, a transmission line junction having input and load arms and a circular waveguide side-arm in which an elliptically polarized field is established, means for deriving a voltage proportional to the difference between the magnitudes of said polarized field at two points angularly spaced about the axis of said side-arm by 90 degrees, means applying said difference voltage to one set of said deflecting elements, means deriving a second voltage proportional to the difference between the magnitudes of said polarized field at two further points angularly displaced by 90 degrees and displaced with respect to said first two points by 45 degrees respectively, means applying said second difference voltage to the second set of said deflecting elements, and a fourth arm on said junction arranged in alignment with the unknown impedance arm, and a variable condenser terminating said fourth arm.

2. A device according to claim 1 wherein the frequency of the applied wave is varied periodically through a predetermined range, and including means for varying the capacity of said condenser in synchronism with the frequency variation to maintain unity reactance.

3. An impedance indicating device comprising a cathode-ray oscilloscope having two pairs of deflecting elements, a transmission line junction having input and load arms and a circular waveguide side-arm in which an elliptically polarized field is established, means for deriving a voltage proportional to the difference between the magnitudes of said polarized field at two points angularly spaced about the axis of said side-arm by 90 degrees, means applying said difference voltage to one set of said deflecting elements, means deriving a second voltage proportional to the difference between the magnitudes of said polarized field at two further points angularly displaced by 90 degrees and displaced with respect to said first two points by 45 degrees respectively, means applying said second difference voltage to the second set of said deflecting elements, said transmission line junction being provided with two circular side-arms extending in opposite directions from said junction, and each side-arm containing a pair of pick-up elements spaced angularly by 90 degrees about the arm axis, the pick-up elements in one arm being displaced with respect to the pick-up elements in the other arm by an angle of 45 degrees, said first difference voltage being derived from the pick-up elements in one side-arm, and the second difference voltage being derived from the pick-up elements in the second side-arm.

4. An impedance indicating device comprising a cathode-ray oscilloscope having two pairs of deflecting elements, a transmission line junction having input and load arms and a circular waveguide side-arm in which an elliptically polarized field is established, means for deriving a voltage proportional to the difference between the magnitudes of said polarized field at two points angularly spaced about the axis of said side-arm by 90 degrees, means applying said difference voltage to one set of said deflecting elements, means deriving a second voltage proportional to the difference between the magnitudes of said polarized field at two further points angularly displaced by 90 degrees and displaced with respect to said first two points by 45 degrees respectively, means applying said second difference voltage to the second set of said deflecting elements, said transmission line junction being provided with four circular side-arms having identical elliptically polarized standing waves established therein, a directional pick-up element located in each side-arm, said pick-up elements being oriented about the respective axes of said side-arms by a progressively increasing angle of 45 degree intervals between the pick-up elements, said first difference voltage being derived from the first and third pick-up elements and said second difference voltage being derived from the second and fourth pick-up elements.

5. Apparatus for measuring high-frequency impedance comprising a section of enclosed-field wave conductor having connecting means at one end for connection to a microwave generator, connecting means at its other end for connection of the unknown impedance to be measured, two pairs of circular side-arms coupled to said conductor on axes laterally displaced with respect to the longitudinal axis of said conductor, four pick-up loops arranged one in each side-arm and mounted at angular positions 45 degrees apart, square-law detectors connected to each of said loops, a subtracting amplifier connected to the detectors for two loops which are 90 degrees apart, a subtracting amplifier connected to the detectors for the other two loops, a cathode ray oscilloscope, and means for connecting one of said amplifiers to the vertically deflecting system of the oscilloscope and the other amplifier to the horizontally deflecting system of the oscilloscope.

6. An impedance indicating device comprising a cathode ray oscilloscope having two pairs of deflecting elements, a transmission line junction having an input arm, a load arm, and a balancing arm, a variable condenser terminating said balancing arm, means for supplying to said input arm an electromagnetic wave which varies in frequency periodically through a predetermined range, means for deriving four voltages proportional to the magnitude of the standing wave field in said load arm at four points spaced equally within one wave length, means for applying to one set of deflecting elements the difference between said first and third derived voltages, means for applying to said second set of deflecting elements the difference in voltage between said second and fourth derived voltages, and means for varying the capacity of said condenser in synchronism with the frequency variation of said wave to maintain unity reactance of said condenser at all frequencies in said range.

7. An impedance measuring device comprising a transmission line junction having at least three arms, one of said arms comprising an input arm for supplying high-frequency electromagnetic energy to the junction, another arm comprising a load arm for connection to an unknown impedance, and a third arm of said junction comprising a circular waveguide section coupled at one end to said input and load arms and dimensioned so that all modes higher than the dominant $H_{11}$ mode are cut-off, a fourth arm arranged in axial alignment with said load arm and extending in an opposite direction from said junction, a variable condenser terminating said fourth arm, pick-up means mounted upon the outer end of said circular waveguide and arranged to explore the field set up in said third arm by said $H_{11}$ modes, and an indicator controlled by said pick-up means.

8. An impedance measuring device comprising a T-junction of enclosed-field transmission lines, one of the aligned arms of said junction comprising a load arm for connection to an unknown impedance, a variable condenser terminating the other aligned arm, and the third arm comprising an input arm for supplying high-frequency electromagnetic energy to said junction, a fourth transmission line connected to said junction and comprising a circular side-arm arranged at right-angles to the plane of said T-junction, mode-filtering means for eliminating all modes from said side-arm except the $H_{11}$ modes, pick-up means mounted upon the outer end of said side-arm and arranged to explore the field set up in said side-arm by said $H_{11}$ modes, and an indicator controlled by said pick-up means.

9. A device according to claim 8 wherein said condenser has unity reactance at the frequency of the applied energy.

References Cited in the file of this patent

UNITED STATES PATENTS

| 2,129,712 | Southworth | Sept. 13, 1938 |
| 2,442,606 | Korman | June 1, 1948 |
| 2,605,323 | Samuel | July 29, 1952 |
| 2,611,005 | Wilson | Sept. 16, 1952 |
| 2,630,474 | Brown | Mar. 3, 1953 |
| 2,630,475 | Woodward | Mar. 3, 1953 |
| 2,723,377 | Cohn | Nov. 8, 1955 |